US010916939B2

United States Patent
Pichon et al.

(10) Patent No.: US 10,916,939 B2
(45) Date of Patent: Feb. 9, 2021

(54) LOW LEAKAGE TRANSIENT OVERVOLTAGE PROTECTION CIRCUIT USING A SERIES CONNECTED METAL OXIDE VARISTOR (MOV) AND SILICON CONTROLLED RECTIFIER (SCR)

(71) Applicants: STMicroelectronics (Tours) SAS, Tours (FR); STMicroelectronics Asia Pacific Pte Ltd, Singapore (SG)

(72) Inventors: Romain Pichon, Reugny (FR); Yannick Hague, Mettray (FR); Sean Choi, Seoul (KP)

(73) Assignees: STMicroelectronics (Tours) SAS, Tours (FR); STMicroelectronics Asia Pacific Pte Ltd, Singapore (SG)

( * ) Notice: Subject to any disclaimer, the term of this patent is extended or adjusted under 35 U.S.C. 154(b) by 199 days.

(21) Appl. No.: 16/149,614

(22) Filed: Oct. 2, 2018

(65) Prior Publication Data
US 2020/0106267 A1    Apr. 2, 2020

(51) Int. Cl.
H02H 9/04 (2006.01)
H02H 9/00 (2006.01)
H01C 7/108 (2006.01)
H01C 7/12 (2006.01)

(52) U.S. Cl.
CPC ............. *H02H 9/046* (2013.01); *H01C 7/108* (2013.01); *H01C 7/12* (2013.01); *H02H 9/005* (2013.01); *H02H 9/042* (2013.01); *H02H 9/044* (2013.01)

(58) Field of Classification Search
CPC ........ H02H 9/046; H02H 9/005; H02H 9/044; H02H 9/042; H02H 9/041; H01C 7/108; H01C 7/12

USPC .................................................. 361/91.1, 118
See application file for complete search history.

(56) References Cited

U.S. PATENT DOCUMENTS

| 3,947,726 A | 3/1976 | DeCecco et al. |
|---|---|---|
| 4,475,139 A | 10/1984 | Chadwick |
| 4,571,535 A | 2/1986 | Gyugyi |
| 4,750,100 A | 6/1988 | Ragsdale |
| 4,912,589 A | 3/1990 | Stolarczyk |
| 5,436,786 A | 7/1995 | Pelly et al. |
| 5,532,635 A | 7/1996 | Watrous et al. |
| 6,226,162 B1 * | 5/2001 | Kladar ..................... H02H 3/44 361/111 |
| 6,226,166 B1 * | 5/2001 | Gumley ................... H02H 9/06 361/111 |
| 6,339,316 B1 | 1/2002 | Eguchi et al. |
| 7,333,316 B1 | 2/2008 | Norris |
| 8,547,673 B2 | 10/2013 | Natili et al. |

(Continued)

OTHER PUBLICATIONS

Bremond, A. et al: "AN1826 Application Note, Transient Protection Solutions: Transil(tm) diode versus Varistor," STMicroelectronics, 2004, 5 pages.

(Continued)

*Primary Examiner* — Dharti H Patel
(74) *Attorney, Agent, or Firm* — Crowe & Dunlevy

(57) ABSTRACT

Transient overvoltage suppression is provided by discharging through a Metal Oxide Varistor (MOV) and Silicon Controlled Rectifier (SCR) which are connected in series between power supply lines. The SCR has a gate that receives a trigger signal generated by a triggering circuit coupled to the power supply lines. A trigger voltage of the triggering circuit is set by a Transil™ avalanche diode.

9 Claims, 2 Drawing Sheets

(56) References Cited

U.S. PATENT DOCUMENTS

| | | |
|---|---|---|
| 8,699,250 B2 | 4/2014 | Young et al. |
| 10,447,026 B2 * | 10/2019 | Kostakis ............... H02H 3/22 |
| 2002/0159212 A1 * | 10/2002 | Oughton, Jr. .......... H02H 9/041 |
| | | 361/111 |
| 2006/0291118 A1 * | 12/2006 | Chen .................... H02H 9/042 |
| | | 361/91.1 |
| 2017/0047733 A1 * | 2/2017 | Buchanan ............. H02H 9/041 |

OTHER PUBLICATIONS

"AN316 Application Note, Transil (tm) clamping protection mode,", STMicroelectronics, Jul. 2014 (17 pages).

* cited by examiner

LOW LEAKAGE TRANSIENT OVERVOLTAGE PROTECTION CIRCUIT USING A SERIES CONNECTED METAL OXIDE VARISTOR (MOV) AND SILICON CONTROLLED RECTIFIER (SCR)

TECHNICAL FIELD

The present invention relates to a circuit for protecting against a transient overvoltage condition due, for example, to a lightning surge on a power supply line.

BACKGROUND

It is known in the art to use a Metal Oxide Varistor (MOV) as a surge protection device. FIG. 1 shows a circuit diagram for a conventional implementation, with a pair of power supply lines 12 and 14 (receiving a direct current DC supply voltage Vin) coupled to a load circuit 16 (provided with an operating voltage $V_{oc}$) and with a first terminal of the MOV 18 connected to supply line 12 and a second terminal of the MOV 18 connected to supply line 14. A concern with the protection circuit of FIG. 1 is that it exhibits a very high leakage current.

An improvement in the protection circuit of FIG. 1 uses a silicon diode for alternating current (SIDAC) device 20 connected in series with the MOV 18 to provide for overvoltage protection with respect to the load circuit 16. Such a circuit is shown in FIG. 2. The operating characteristics of the FIG. 2 protection circuit are shown in FIG. 3. The response of the protection circuit to a transient voltage surge 26 on the power supply lines 12 and 14 occurs when the surge voltage (Vsurge) exceeds the sum of the voltage drop across the MOV 18 ($V_{mov}$) and the breakover voltage ($V_{BO}$) of the SIDAC device 20. At this voltage, the SIDAC device 20 turns on and the voltage ($V_{DD}$) applied to the load settles at the voltage drop across the MOV 18 ($V_{MOV}$). The SIDAC device 20 remains turned on until current flowing through the device due to the transient surge condition falls below a holding current threshold. A concern with the protection circuit of FIG. 2 is that the actuation voltage ($V_{MOV}+V_{BO}$) for turning on transient voltage suppression may exceed the maximum rated DC voltage of the load resulting in damage to the load circuit.

There is a need for an improved performance transient voltage suppression protection circuit.

SUMMARY

In an embodiment, a circuit comprises: a first power supply line; a second power supply line; a Metal Oxide Varistor (MOV) connected between the first power supply line and a first node; a Silicon Controlled Rectifier (SCR) having an anode terminal connected to the first node and a cathode terminal connected to the second power supply line, the SCR having a gate terminal; and a trigger circuit connected between the first and second power supply lines and having an output connected to the gate terminal of the SCR, wherein the triggering circuit has a trigger voltage set by a Transil™ avalanche diode.

In an embodiment, a method comprises: sensing a transient overvoltage condition across a pair of power supply lines using a Transil™ avalanche diode; triggering turn on of a Silicon Controlled Rectifier (SCR) in response to the sensed transient overvoltage condition; and passing discharge of the transient overvoltage condition through a Metal Oxide Varistor (MOV) connected in series with the SCR between the pair of power supply lines.

In an embodiment, a circuit comprises: a first power supply line; a second power supply line; a Metal Oxide Varistor (MOV) connected between the first power supply line and a first node; a Silicon Controlled Rectifier (SCR) having an anode terminal connected to the first node and a cathode terminal connected to the second power supply line, the SCR having a gate terminal; and a trigger circuit coupled to the first and second power supply lines and having a trigger voltage set by an avalanche diode, the trigger circuit configured to generate a trigger signal for application through the gate terminal to control turn on of the SCR in response to a transient overvoltage across the first and second power supply lines which exceeds the trigger voltage.

BRIEF DESCRIPTION OF THE DRAWINGS

For a better understanding of the embodiments, reference will now be made by way of example only to the accompanying figures in which.

DETAILED DESCRIPTION

Figure 1:
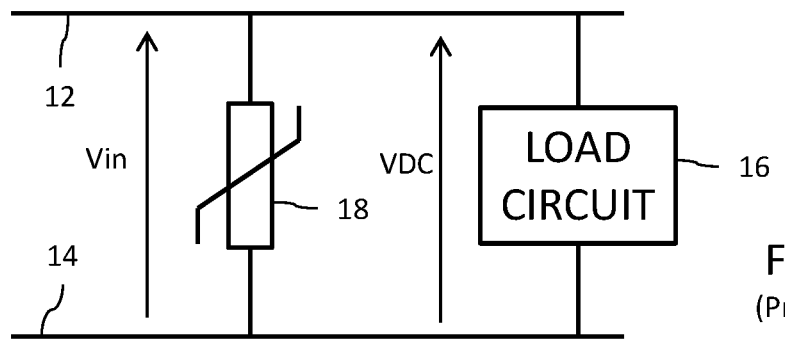
FIG. 1 is a circuit diagram of a surge protection circuit using a Metal Oxide Varistor (MOV)
Figure 2:
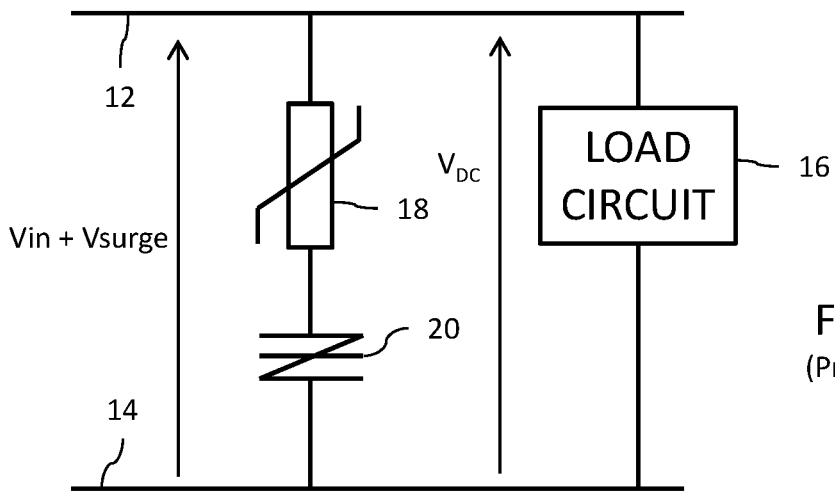
FIG. 2 is a circuit diagram of a surge protection circuit using a MOV and silicon diode for alternating current (SIDAC) device.
Figure 3:
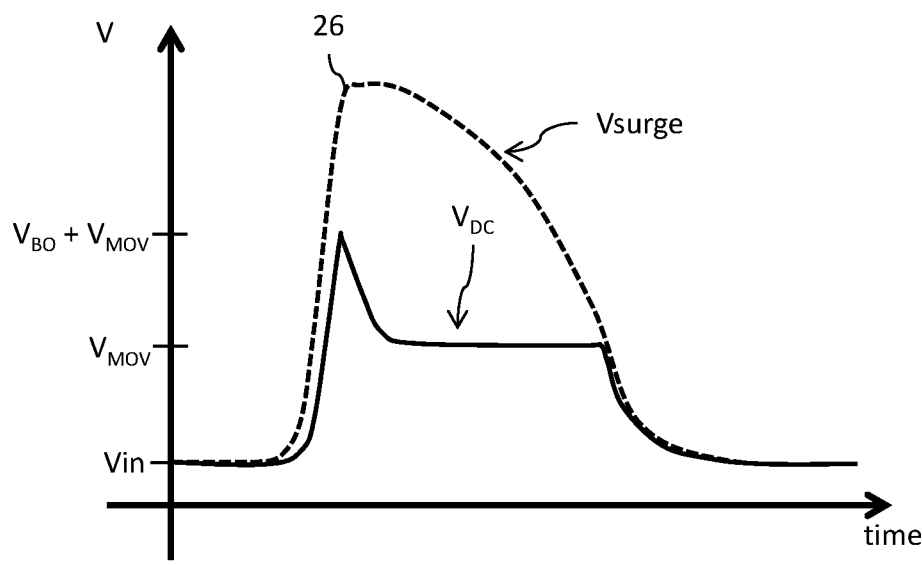
FIG. 3 illustrates operation of the circuit of FIG. 2.
Figure 4:
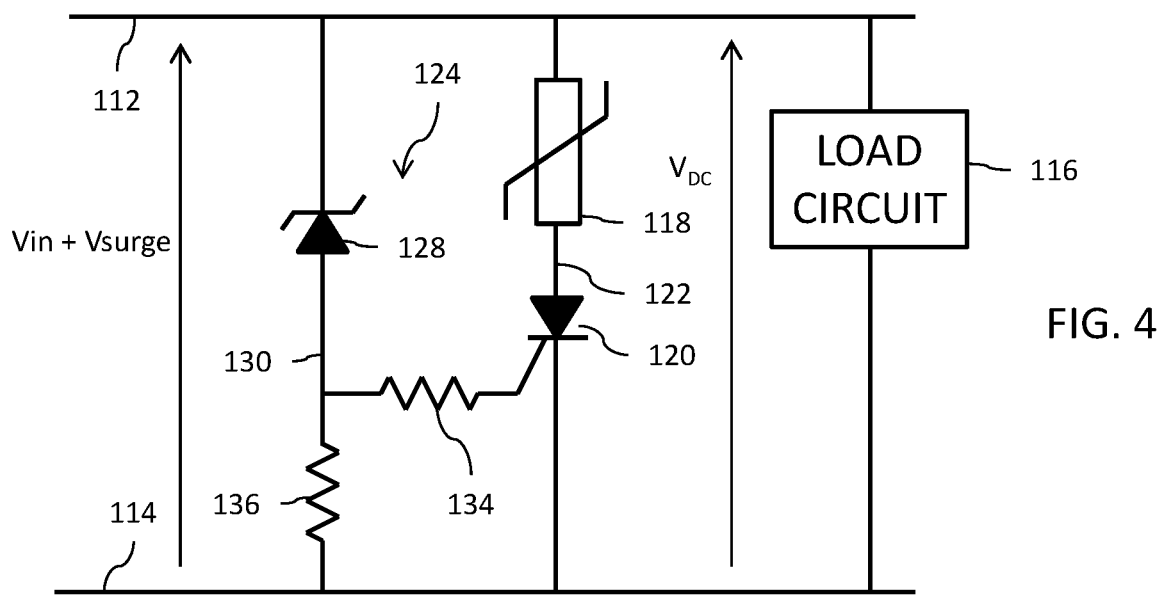
FIG. 4 is a circuit diagram of a surge protection circuit using a MOV and silicon controlled rectifier (SCR)

Reference is now made to FIG. 4 which shows a circuit diagram of a surge protection circuit using a Metal Oxide Varistor (MOV) and silicon controlled rectifier (SCR). A pair of power supply lines 112 and 114 receive a direct current DC supply voltage Vin and are coupled to a load circuit 116 that is provided with an operating voltage $V_{DC}$. A first terminal of the MOV 118 is connected to supply line 112 and a second terminal of the MOV 18 is connected to node 122. An anode terminal of the SCR 120 is connected to node 122 and a cathode terminal of the SCR 120 is connected to supply line 114. The SCR 120 is a cathodegated device, with the cathode gate terminal connected to a trigger circuit 124. The trigger circuit 124 includes a Transil™ avalanche diode 128 having a cathode terminal connected to supply line 112 and an anode terminal connected to node 130. More information on the Transil™ avalanche diode 128 may be obtained by reference to: a) Application Note AN316, Rev. 4, STMicroelectronics, July 2014 (incorporated by reference), and b) Application Note 1826, STMicroelectronics, July 2004 (incorporated by reference). The trigger circuit 124 further includes a first resistor 134 having a first terminal connected to the cathode gate of the SCR 120 and a second terminal connected to node 130, and a second resistor 136 having a first terminal connected to node 130 and a second terminal connected to supply line 114.

Figure 5:
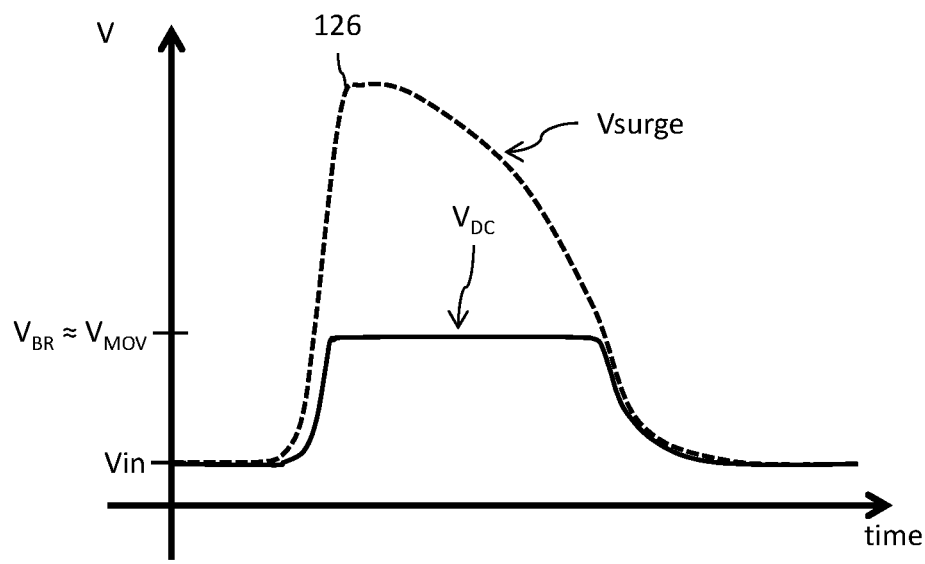
FIG. 5 illustrates operation of the circuit of FIG. 4.

FIG. 5 illustrates operation of the circuit of FIG. 4. The response of the protection circuit to a transient voltage surge 126 on the power supply lines 12 and 14 occurs when the surge voltage (Vsurge) exceeds the break down voltage ($V_{BR}$) of the Transil™ avalanche diode 128. At this point, current flows through the cathode gate of the SCR 120 and the SCR 120 turns on. In this configuration, the SCR 120 is in a direct polarized operating condition with the voltage at the anode terminal being greater than the voltage at the cathode terminal. For the duration of the surge, the SCR 120 remains on and surge energy flows through the SCR 120 and the MOV 118. The MOV 118 functions to limit the current flowing through the SCR 120. The voltage ($V_{DC}$) applied to the load is clamped at the voltage drop ($V_{MOV}$) across the MOV 118 which by circuit design is substantially equal (i.e., within ±1-3%) to the break down voltage ($V_{BR}$) of the Transil™ avalanche diode 128.

In an embodiment, the following circuit components may be used: 14D391 for the MOV 118; TN5015H-6T for the SCR 120; BZW04-376 for the Transil™ avalanche diode 128; 3 Kohm for resistor 130 and 2 Kohm for resistor 132.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A circuit, comprising:
   a first power supply line and a second power supply line configured to receive a direct current (DC) voltage;
   a Metal Oxide Varistor (MOV) connected between the first power supply line and a first node;
   a Silicon Controlled Rectifier (SCR) having an anode terminal connected to the first node and a cathode terminal connected to the second power supply line, the SCR having a gate terminal; and
   a trigger circuit connected between the first and second power supply lines and having an output connected to the gate terminal of the SCR, wherein the triggering circuit comprises:
   a unidirectional Transil™ avalanche diode having a cathode directly electrically connected to the first power supply line and an anode directly electrically connected to an intermediate node;
   a first resistor having a first terminal directly electrically connected to the intermediate node and a second terminal directly electrically connected to the second power supply line; and
   a second resistor having a first terminal directly electrically connected to the intermediate node and a second terminal directly electrically connected to the gate terminal;
   wherein the trigger circuit has a trigger voltage for detecting a transient voltage surge of the DC voltage that is set by the unidirectional Transil™ avalanche diode.

2. The circuit of claim 1, wherein the gate terminal is a cathode gate terminal.

3. The circuit of claim 1, wherein a break down voltage of the unidirectional Transil™ avalanche diode is substantially equal to a voltage drop across the MOV.

4. The circuit of claim 1, wherein the first resistor and second resistor each have a resistance that is greater than a kilohm.

5. A circuit, comprising:
   a first power supply line and a second power supply line configured to receive a direct current (DC) voltage;
   a Metal Oxide Varistor (MOV) connected between the first power supply line and a first node;
   a Silicon Controlled Rectifier (SCR) having an anode terminal connected to the first node and a cathode terminal connected to the second power supply line, the SCR having a gate terminal; and
   a trigger circuit, comprising:
   a unidirectional avalanche diode having a cathode directly electrically connected to the first power supply line and an anode directly electrically connected to an intermediate node;
   a first resistor having a first terminal directly electrically connected to the intermediate node and a second terminal directly electrically connected to the second power supply line; and
   a second resistor having a first terminal directly electrically connected to the intermediate node and a second terminal directly electrically connected to the gate terminal;
   wherein the trigger circuit has a trigger voltage set by the unidirectional avalanche diode, the trigger circuit configured to generate a trigger signal at the gate terminal to control turn on of the SCR in response to a transient overvoltage condition of the DC voltage which exceeds the trigger voltage.

6. The circuit of claim 5, wherein the unidirectional avalanche diode is a Transil™ avalanche diode.

7. The circuit of claim 5, wherein the gate terminal is a cathode gate terminal.

8. The circuit of claim 5, wherein a break down voltage of the unidirectional avalanche diode is substantially equal to a voltage drop across the MOV.

9. The circuit of claim 5, wherein the first resistor and second resistor each have a resistance that is greater than a kilohm.

* * * * *